Sept. 28, 1937.  R. W. AMANN  2,094,516

HOOK

Filed June 22, 1936

Ralph W. Amann
INVENTOR

BY Victor J. Evans & Co.
HIS ATTORNEYS

Patented Sept. 28, 1937

2,094,516

UNITED STATES PATENT OFFICE 2,094,516

HOOK

Ralph W. Amann, Chicago, Ill.

Application June 22, 1936, Serial No. 86,660

6 Claims. (Cl. 292—109)

My invention relates to hooks, and includes among its objects and advantages an improvement in and an extension of the usefulness of devices of the type employed chiefly in hooking doors, windows, etc.

Figure 1:
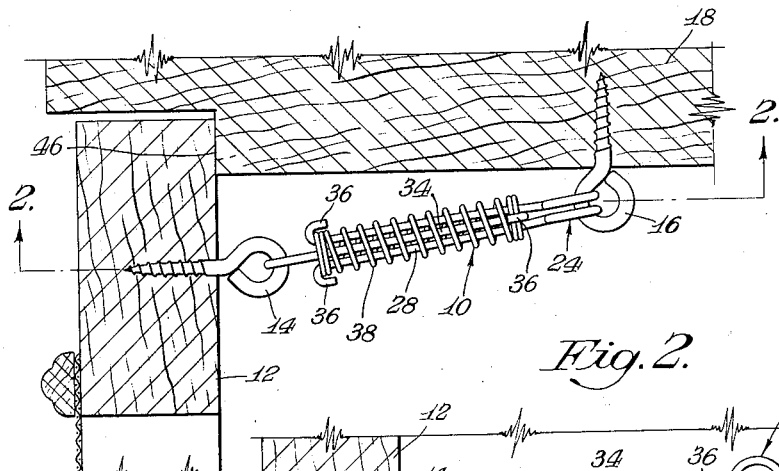
Fig. 1 is a sectional view of a door and a door frame illustrating my invention applied thereto.

In the embodiment selected to illustrate my invention, I make use of a hook 10 attached to a screen door 12 through the medium of a conventional eye screw 14. The other end of the hook may be hooked into the eye screw 16 anchored in the door frame 18.

Specifically, the hook 10 comprises a piece of wire bent back upon itself at 20 to provide two reaches 22 shaped to provide a hook part 24 for connection with the eye screw 16. The reaches 22 are bent at 26 to provide two straight reaches 28 arranged in converging relation.

The second part of the hook comprises a wire bent to provide a loop 30 substantially encircling the eye of the screw 14 to be connected therewith. The wire is bent at 32 to provide two straight reaches 34 arranged in converging relation. The ends of the reaches 28 and 34 are bent to provide hooks 36.

Figure 4:
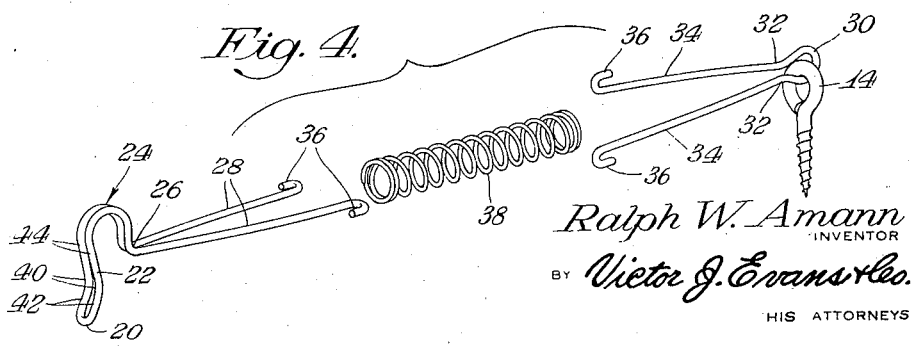
Fig. 4 is a perspective view of the hook parts in separated relation.

Reaches 28 and 34 are threaded through a coil spring 38, and the hooks 36 hooked over the ends of the coil spring 38. In arranging the reaches 28 and 34 in the converging relation illustrated in Fig. 4, the reaches spread after being threaded through the coil spring 38 in such a manner as to hold the hooks 36 in effective hooked relation with the ends of the coil spring 38.

The reaches 28 lie in a plane at right angles to the reaches 34, whereby the reaches may be loosely nested within the spring 30 of small diameter. Thus, the hook part 24 is resiliently connected with the eye screw 14, and the reaches 28 may be shifted longitudinally of the reaches 34 by exerting a pull on the hook part 24 for compressing the spring 38.

Figure 3:
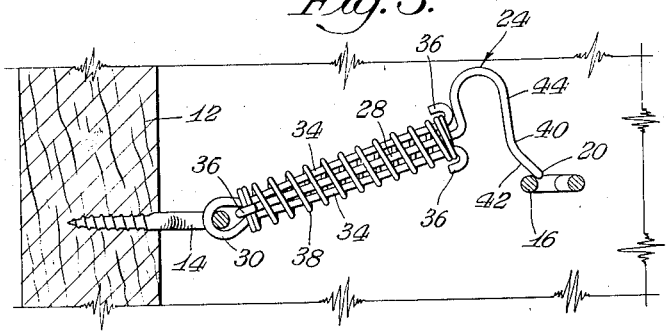
Fig. 3 is a side elevation of the hook.

In Fig. 3 I illustrate the manner in which the hook 10 is mounted so as to cause a pull to be exerted on the door 12 after the hook part 24 has been connected with the eye screw 16. The reaches 22 are bent at 40 to provide camming reaches 42 arranged to engage the eye screw 16.

Figure 2:
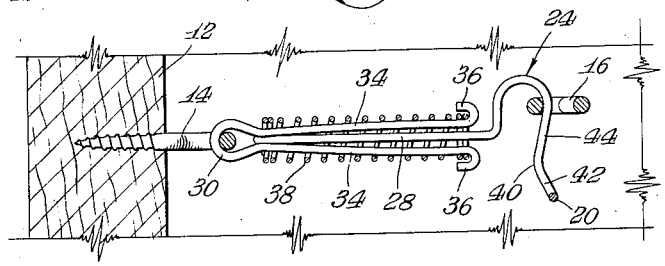
Fig. 2 is a sectional view of the hook applied to the door and the door frame.

When the hook is positioned according to Fig. 3 and pressed home, the hook part 24 will move easily into the eye screw 16 against the tension of the spring 38 because of the cam surfaces 42. The straight part 44 of the reaches 22 is shaped so as to be arranged at a slight angle to the vertical when the hook is positioned according to Fig. 2, which causes the hook part to be firmly connected with the eye screw 16. When the hook 10 is positioned according to Fig. 2, the door 12 will be held firmly against its abutment 46 by reason of the tension of the spring 38 so as to insure complete closing of the door and elimination of rattling.

Because of the spring tension incorporated in the hook 10, doors, windows, and the like are at all times held firmly against their cooperating abutments. Because of the extensible nature of the hook, I eliminate the necessity for precise positioning and adjustment of the eye screws 14 and 16. In conventional hooks much difficulty is experienced in positioning the eye screws 14 and 16 and repeated adjustment of the eye screws after installation of the hook causes loosening of the hooks and frequent shifting thereof, which results in marring the door and frame structure. The hook part 24 provides a grip facilitating positioning of the hook part with respect to the eye screw 16, and the effective tension of the spring 38 may be determined by spacing of the eye screws 14 and 16.

After the parts making up the hook 10 have been assembled, the parts are held in connected relation because of the tension of the reaches 28 and 34 which press outwardly against the convolutions of the spring. In this way, the hooks 36 will always hook over the end convolutions of the spring 38 when tension is applied to the spring. The converging relation between the reaches 28 and 34 facilitate assembly of the parts. In assembling the parts, the reaches 28 or 34 are pressed together and threaded through the coil spring 38. The hooks 36 may be passed easily through the coil spring, and when pushed sufficiently far, the tension of the reaches separates the hooks 36 for engagement with the ends of the coil spring.

All the parts may be made of wire having sufficient spring tension and rust resisting properties so that the hook will last indefinitely.

Without further elaboration, the foregoing will so fully explain my invention that others may, by applying current knowledge, readily adapt the same for use under various conditions of service.

I claim:

1. A device of the type described comprising a coil spring, a hook part having preformed means threaded through the spring and connected with one end thereof, and preformed anchoring means threaded through the coil spring and connected with the other end of the coil spring, said hook means being shiftable relatively to the anchoring means against the tension of said coil spring.

2. A device of the type described comprising a coil spring, a hook part comprising a wire bent to provide a plurality of reaches extending through the coil spring and connected with one end, and anchoring means comprising a wire bent to provide a plurality of reaches threaded through the coil spring and connected with the opposite end of the coil spring.

3. A device of the type described comprising a coil spring, a hook part including resilient hook reaches extending longitudinally of the coil spring and hooked over one end thereof, and anchoring means including a plurality of hook reaches extending longitudinally of the coil spring and hooked over the opposite end of the coil spring, all said hook reaches being preformed.

4. A device of the type described comprising a coil spring, a hook part having resilient reaches threaded through the coil spring and provided with hooks having connected relation with one end of the coil spring, and an anchoring part including a plurality of resilient reaches threaded through the coil spring and having hooks connected with the opposite end of the coil spring, all said reaches and said hooks being preformed.

5. A device of the type described comprising a coil spring, a hook part having resilient reaches threaded through the coil spring and provided with hooks having connected relation with one end of the coil spring, and an anchoring part including a plurality of resilient reaches threaded through the coil spring and having hooks connected with the opposite end of the coil spring, said first named resilient reaches being positioned substantially in a plane at right angles to the second named resilient reaches.

6. A device of the type described comprising a coil spring, a wire hook having a hook reach extending longitudinally of the coil spring and hooked over one end thereof, a wire eyelet having a hook reach extending longitudinally of the spring and hooked over the opposite end thereof, and means connected with the eyelet for anchoring the same to a supporting structure, said hook reaches being preformed.

RALPH W. AMANN.